United States Patent
Yan et al.

(10) Patent No.: US 12,475,383 B1
(45) Date of Patent: Nov. 18, 2025

(54) ONTOLOGY-DRIVEN METHOD AND SYSTEM FOR CONSTRUCTING FISH KNOWLEDGE GRAPH IN TARGET REGION

(71) Applicant: Guangdong Ocean University, Zhanjiang (CN)

(72) Inventors: Yunrong Yan, Zhanjiang (CN); Xurui Liao, Zhanjiang (CN); Qijun Zhou, Zhanjiang (CN); Xiaojun Tan, Zhanjiang (CN); Aimin Lu, Zhanjiang (CN); Zhao Li, Zhanjiang (CN)

(73) Assignee: Guangdong Ocean University, Zhanjiang (CN)

( * ) Notice: Subject to any disclaimer, the term of this patent is extended or adjusted under 35 U.S.C. 154(b) by 0 days.

(21) Appl. No.: 19/080,814

(22) Filed: Mar. 15, 2025

(30) Foreign Application Priority Data

May 17, 2024 (CN) .......................... 202410611965.8

(51) Int. Cl.
- *G06N 5/02* (2023.01)
- *G06F 40/30* (2020.01)
- *G06V 20/70* (2022.01)

(52) U.S. Cl.
CPC ............... *G06N 5/02* (2013.01); *G06F 40/30* (2020.01); *G06V 20/70* (2022.01)

(58) Field of Classification Search
CPC ........... G06N 5/02; G06F 40/30; G06V 20/70
See application file for complete search history.

(56) References Cited

U.S. PATENT DOCUMENTS

| | | | |
|---|---|---|---|
| 2024/0320524 A1* | 9/2024 | Shen | G06N 3/08 |
| 2025/0173568 A1* | 5/2025 | Cresswell | G06N 3/08 |

OTHER PUBLICATIONS

Ali, Najib M., et al. "Fish Ontology framework for taxonomy-based fish recognition." PeerJ 5 (2017): e3811. (Year: 2017).*
Feng, Duoduo, Xiangteng He, and Yuxin Peng. "MKVSE: Multimodal knowledge enhanced visual-semantic embedding for image-text retrieval." ACM Transactions on Multimedia Computing, Communications and Applications 19.5 (2023): 1-21. (Year: 2023).*

(Continued)

*Primary Examiner* — Kevin W Figueroa
(74) *Attorney, Agent, or Firm* — Hemisphere Law, PLLC; Zhigang Ma

(57) ABSTRACT

An ontologically driven method and a system for constructing a fish knowledge graph in a target region, including: combing a fish data source in the target region, constructing a fish knowledge ontology in the target region, and collecting text data and image data; according to the fish knowledge ontology of the target region, performing knowledge extraction on the text data, and measuring information content of knowledge extraction results to obtain text information weights; according to the fish knowledge ontology in the target region, performing the knowledge extraction on the image data, and measuring information content of the knowledge extraction results to obtain image information weights; according to the text information weights and the image information weights, matching the first knowledge extraction results with the fish knowledge ontology in the target region, and constructing a multi-modal knowledge graph. The processing accuracy and efficiency of the unstructured fish information can be improved.

7 Claims, 3 Drawing Sheets

(56) References Cited

OTHER PUBLICATIONS

CNIPA, Notification of First Office Action for CN202410611965.8, Jun. 20, 2024.
Guangdong Ocean University (Applicant), Replacement claims (allowed) of CN202410611965.8, Jun. 21, 2024.
CNIPA, Notification to grant patent right for invention in CN202410611965.8, Jul. 3, 2024.

* cited by examiner

ONTOLOGY-DRIVEN METHOD AND SYSTEM FOR CONSTRUCTING FISH KNOWLEDGE GRAPH IN TARGET REGION

CROSS-REFERENCE TO RELATED APPLICATION

This application claims priority to Chinese patent application No. CN202410611965.8, filed to China National Intellectual Property Administration (CNIPA) on May 17, 2024, which is herein incorporated by reference in its entirety.

TECHNICAL FIELD

The disclosure relates to the field of computer technology, and particularly to an ontology-driven method and a system for constructing a fish knowledge graph in a target region.

BACKGROUND

Due to the heavy reliance on manual operations in traditional fish information statistics and analysis, and considering that manual operations carry the risk of information omission or data statistical errors, this results in low accuracy in the collection of fish information within target regions, and makes it impossible to process unstructured big data related to fish.

SUMMARY

In order to overcome the problems existing in related art, the disclosure provides an ontology-driven method and a system for constructing a fish knowledge graph in a target region, which can improve the accuracy and efficiency of unstructured fish information processing.

In a first aspect, the disclosure provides an ontology-driven method for constructing fish knowledge graphs in a target region, including:
  combing a fish data source in the target region, constructing a fish knowledge ontology in the target region, and collecting text data in an unstructured form of the fish data source in the target region and at least one image data corresponding to the text data;
  according to the fish knowledge ontology of the target region, performing knowledge extraction on the text data to obtain multiple first knowledge extraction results, and measuring information content of the multiple first knowledge extraction results respectively to obtain text information weights; where the multiple first knowledge extraction results include: entities and a relationship between the entities in the text data;
  according to the fish knowledge ontology in the target region, performing the knowledge extraction on the at least one image data to obtain multiple second knowledge extraction results, and measuring information content of the multiple second knowledge extraction results respectively to obtain image information weights; where the multiple second knowledge extraction results include: entities and a relationship between the entities in the at least one image data; and
  according to the text information weights and the image information weights, matching the multiple first knowledge extraction results and the multiple second knowledge extraction results with the fish knowledge ontology in the target region, and constructing a multi-modal knowledge graph as the fish knowledge graph.

According to the constructed multi-modal knowledge graph as the fish knowledge graph, the constructed multi-modal knowledge graph as the fish knowledge graph is applied to data collection and preprocessing, entity recognition and relationship extraction, multi-modal data fusion and modeling, application and evaluation, and maintenance and updating. Specifically, data are collected from various sources such as text databases, image libraries, video platforms, etc., and diversity and representativeness of data are ensured to cover all aspects of the target domain. The word segmentation, stop word removal, stem extraction, and other processing are performed on text data, and for feature extraction of image and video data, such as using deep learning models, key features of images are extracted. The speech recognition and text conversion are performed on audio data for fusion with text data. Using named entity recognition technology, entities are extracted from text data; Identify entities from image and video data using models such as object detection. Using relationship extraction technology, the relationships between entities are identified based on contextual information from textual data, and the spatial and temporal relationships in images and videos are analyzed to infer potential connections between entities. The data from different modalities are fused to handle heterogeneity and incompatibility between different data modalities. Using the data fusion algorithms, such as joint representation or collaborative representation, multi-modal information are integrated into a unified knowledge graph. A relationship graph between entities is established based on their associated features and attributes. Using the graph databases or knowledge graph management systems, the multi-modal knowledge graph are stored and managed. The social recommendation provides personalized recommendation services to users based on their interests and behavior data, combined with entities and relationships in the multi-modal knowledge graph. Automatic driving, using the road information, traffic signs, vehicles, pedestrians and other entities and their relationships in the multi-modal knowledge graph, improves the perception and decision-making ability of the automatic drive system. Intelligent question and answer, combined with text, image and video information in the multi-modal knowledge graph, provides users with more comprehensive and accurate question and answer services. The accuracy and integrity of the multi-modal knowledge graph are evaluated, the performance of the multi-modal knowledge graph is quantitatively evaluated according to the requirements of the application scenarios, such as the recommendation accuracy and the safety of the automatic driving system. The new data is regularly collected and update it into the multi-modal knowledge graph. The outdated data is cleaned up and deleted to maintain the timeliness and accuracy of the knowledge graph. The model is optimized and improved, based on application feedback and data changes, for entity recognition, relationship extraction, and data fusion. The new technologies and algorithms are introduced to improve the efficiency of constructing and applying multi-modal knowledge graphs. In summary, the practical application process of the multi-modal graph involves multiple stages such as data collection and preprocessing, entity recognition and relationship extraction, multi-modal data fusion and modeling, application and evaluation, as well as maintenance and updating. By continuously improving and optimizing these aspects, a more accurate, comprehensive, and practical multi-modal knowledge graph can be constructed, providing strong support for applications in various fields.

The disclosure extracts knowledge from unstructured text data and image data respectively, measures the information content of the knowledge extraction results of the two types of data respectively, and obtains the text information weights and the image information weights correspondingly. Based on the information weights of the two types of data information, a variety of unstructured information can be synthesized, an accurate multi-modal knowledge graph is constructed, and the error caused by manual operation can be avoided.

In an embodiment, the performing knowledge extraction on the text data to obtain multiple first knowledge extraction results includes:

taking the text data as input of a text semantic analysis model based on pre-training for the knowledge extraction, and outputting the multiple first knowledge extraction results; wherein the text semantic analysis model is obtained by: taking a text training data as a first positive sample, constructing a first negative sample by an initial image semantic analysis model that performs the knowledge extraction on image training data, and training an initial text semantic analysis model according to the first positive sample and the first negative sample to obtain the text semantic analysis model.

The disclosure adopts a pre-trained text semantic analysis model to extract knowledge from the text data, which can automatically extract knowledge to avoid errors caused by manual operation, combines the image semantic analysis model to train the initial text semantic analysis model, and can coupling information between the image data and the text data, thus improving the generalization ability based on the text semantic analysis model, and further, improving the processing efficiency of fish information in the unstructured text data.

In an embodiment, the constructing a first negative sample by an initial image semantic analysis model that performs the knowledge extraction on image training data includes:

taking the image training data as a second positive sample, inputting the second positive sample into the initial image semantic analysis model for the knowledge extraction, and outputting image positive training results; extracting first replacement data from the image positive training results, and replacing the first positive sample with the first replacement data to obtain the first negative sample; where the initial image semantic analysis model is configured to generate the image semantic analysis model after iterative training so that the knowledge extraction of the at least one image data be capable of being performed according to the image semantic analysis model.

In an embodiment, the inputting the second positive sample into the initial image semantic analysis model for the knowledge extraction, and outputting image positive training results includes:

inputting the second positive sample into a decoder of the initial image semantic analysis model, obtaining output feature layer parameters, and obtaining similarity between the output feature layer parameters and feature layer parameters of read image training data that has been performed the extraction by knowledge, and outputting the image positive training results according to the similarity.

In an embodiment, the outputting the image positive training results according to the similarity includes:

when the similarity is not within a preset threshold range, taking the output feature layer parameters as input of an encoder of the initial image semantic analysis model, and outputting the image positive training result of the second positive sample;

when the similarity is within a preset threshold range, taking the image positive training results corresponding to the read image training data as the image positive training results of the second positive sample;

according to the image positive training results, training the initial image semantic analysis model to obtain the image semantic analysis model.

The disclosure compares the read image training data with the feature layer parameters of the image training data being trained. If the similarity of the feature layer parameters is within the preset threshold range, the encoder can skip the processing of the feature layer parameters and directly take the image positive training results of the read image training data as the image positive training results of the current training. Thus, the training efficiency of the image semantic analysis model can be improved, and the processing efficiency of the unstructured fish information can be improved.

In an embodiment, the according to the image positive training results, training the initial image semantic analysis model to obtain the image semantic analysis model includes:

taking the first positive sample as input of the initial text semantic analysis model, outputting text positive training results correspondingly, extracting second replacement data from the text positive training results, and randomly replacing the second positive sample with the second replacement data to obtain a second negative sample; and according to the second positive sample and the second negative sample, training the initial image semantic analysis model to obtain the image semantic analysis model.

In an embodiment, the measuring information content of the multiple first knowledge extraction results respectively to obtain text information weight includes:

taking information in the text data as total information and information in the multiple first knowledge extraction results as target information; obtaining the information content of the multiple first knowledge extraction results successively according to the total information and the target information, and obtaining the text information weights of the multiple first knowledge extraction results respectively based on the text information content and an entropy weight method.

In an embodiment, the obtaining the text information weights of the multiple first knowledge extraction results respectively based on the information content and an entropy weight method includes:

normalizing the text information content to obtain multiple normalized results, forming the multiple normalized results into an information vector in a one-dimensional form, obtaining an information entropy of each value of the information vector, and according to the information entropy, obtaining the text information weights corresponding to the multiple first knowledge extraction results.

The disclosure adopts the information measurement of the first knowledge extraction results, and obtains the text information weights based on the entropy weight method, so as to measure the text information weights according to the information content in the text information. The complexity of the text data can be obtained through the text information weights. Based on the text information weights and image information weights, the first knowledge extraction results and the second knowledge extraction results are precisely matched with the fish in the target region, and a more accurate multi-modal knowledge graph is constructed, so as to improve the accuracy of the processing if the unstructured fish information.

In an embodiment, the constructing a multi-modal knowledge graph includes:

according to the text information weights and the image information weights, aligning and fusing the entities and the relationship in the multiple first knowledge extraction results and the entities and the relationship in the multiple second knowledge extraction results to obtain a knowledge fusion result, and matching the knowledge fusion result with the fish knowledge ontology in the target region to construct the multi-modal knowledge graph.

In a second aspect, the disclosure provides an ontology driven system for constructing a fish knowledge graph in a target region, including: a preprocessing module, a text knowledge extraction module, an image knowledge extraction module, and a knowledge graph construction module.

The preprocessing module is configured to comb a fish data source in the target region, construct a fish knowledge ontology in the target region, and collect text data in an unstructured form of the fish data source in the target region and at least one image data corresponding to the text data.

The text knowledge extraction module is configured to, according to the fish knowledge ontology of the target region, perform knowledge extraction on the text data to obtain multiple first knowledge extraction results, and measure information content of the multiple first knowledge extraction results respectively to obtain text information weights; and the multiple first knowledge extraction results include: entities and a relationship between the entities in the text data.

The image knowledge extraction module is configured to, according to the fish knowledge ontology in the target region, perform the knowledge extraction on the at least one image data to obtain multiple second knowledge extraction results, and measure information content of the multiple second knowledge extraction results respectively to obtain image information weights; and the multiple second knowledge extraction results include: entities and a relationship between the entities in the at least one image data.

The knowledge graph construction module is configured to, according to the text information weight and the image information weight, match the multiple first knowledge extraction results and the multiple second knowledge extraction results with the fish knowledge ontology in the target region, and construct a multi-modal knowledge graph as the fish knowledge graph.

DETAILED DESCRIPTION OF EMBODIMENTS

The following is a clear and complete description of the technical solution in the embodiments of the disclosure in combination with the drawings attached to the embodiments of the disclosure. Apparently, the described embodiment is only a part of the embodiments of the disclosure, but not the whole embodiment. Based on the embodiments of the disclosure, all other embodiments obtained by those skilled in the art without making creative labor fall within the scope of protection of the disclosure.

It is worth explaining that the traditional fish information statistics and analysis have artificial statistical errors, and cannot handle a large number of data, especially the unstructured fish information statistics. Based on this, the disclosure provides an ontology-driven method and a system for constructing a fish knowledge graph in a target region. The disclosure adopts the knowledge graph establishment of fish information, which can improve the statistical accuracy and efficiency of fish information, especially for unstructured fish information processing.

In order to better illustrate the technical solution of the disclosure, the following embodiments will be described in detail.

Embodiment 1

Figure 1:
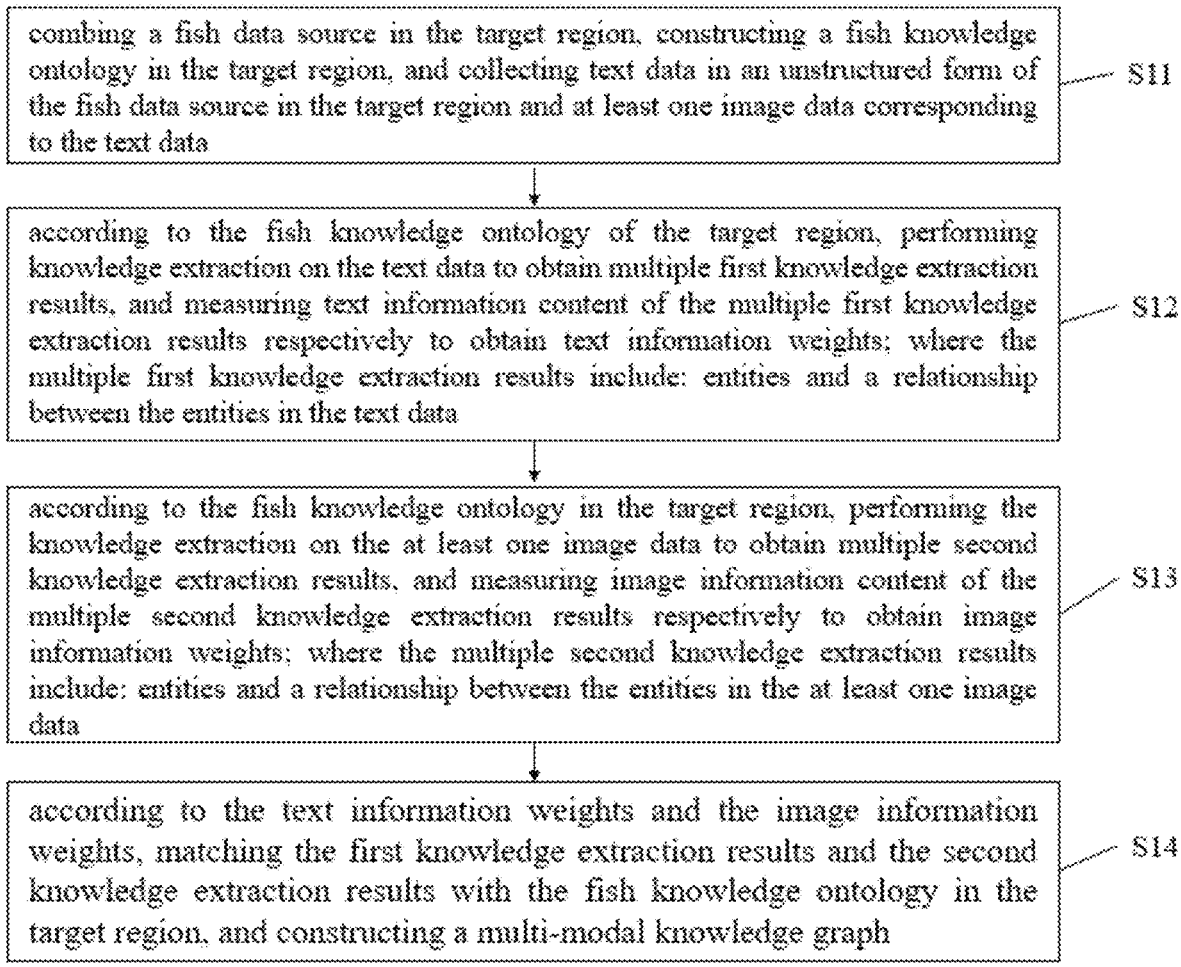
FIG. 1 illustrates a schematic flowchart of an ontology-driven method for constructing a fish knowledge graph in a target region according to an embodiment of the disclosure.

Referring to FIG. 1, FIG. 1 illustrates a schematic flowchart of an ontology-driven method for constructing a fish knowledge graph in a target region according to an embodiment of the disclosure, including: step S11 to step S14, specifically as follow.

Step S11: combing a fish data source in the target region, constructing a fish knowledge ontology in the target region, and collecting text data in an unstructured form of the fish data source in the target region and at least one image data corresponding to the text data.

In some embodiments, the combing a fish data source in the target region includes methods such as data processing, picture tagging, document splitting knowledge extraction or word processing techniques based on at least one of the species, distribution, ecological habits or economic value of fish.

In some embodiments, according to the species, distribution, ecological habits and economic value of fish, the data processing, picture tagging, document splitting knowledge extraction or word processing are carried out to construct the fish knowledge ontology in the target region.

In some embodiments, the fish knowledge ontology of the target region is represented in the triplet form of [head entity, relationship, tail entity]. The entities include the head entity and the tail entity.

In some embodiments, the fish knowledge ontology of the target region is represented in the triplet form of [entity, relationship, attribute].

In some embodiments, the collecting text data of the fish data source in the target region and at least one image data corresponding to the text data includes at least one of structured data, semi-structured data and unstructured data.

In some embodiments, according to the fish knowledge ontology of the target region, the classification algorithm can be used to extract knowledge from semi-structured text data and text data corresponding to the at least one image data. Specifically, support vector machine (SVM) or logistic regression algorithm can be used.

In some embodiments, the database mapping relationship can be adopted when the structured text data and the at least one image data corresponding to the text data are extracted according to the fish knowledge ontology in the target region. Specifically, relational databases (RDB) to resource description framework (RDF) data set mapping language can be used.

In some embodiments, RDB to RDF mapping language (R2RML) can be used to extract knowledge from the structured data.

In some embodiments, knowledge extraction of unstructured text data is carried out through a pre-trained text semantic analysis model according to the fish knowledge ontology in the target region.

In some embodiments, knowledge extraction of unstructured image data is carried out through a pre-trained image semantic analysis model according to the fish knowledge ontology in the target region.

In some embodiments, the knowledge extraction includes at least one of entity extraction, relationship extraction between the entities, and attribute extraction of the entities.

Next, the process of knowledge extraction from unstructured text data will be introduced.

It is worth explaining that the knowledge extraction of text data includes the training process of a text extraction model and the formal use process of the text extraction model. In this embodiment, the text extraction model is a text semantic analysis model.

Step S12: according to the fish knowledge ontology of the target region, performing knowledge extraction on the text data to obtain multiple first knowledge extraction results, and measuring information content of the multiple first knowledge extraction results respectively to obtain text information weights; where the multiple first knowledge extraction results include: entities and a relationship between the entities in the text data.

It is worth noting that the first knowledge extraction results are results of knowledge extraction of the text data, including: the relationship between entities in the text data and entities in the text data. The second knowledge extraction results are results after knowledge extraction of image data, including: the relationship between entities in the image data and entities in the image data.

In some embodiments, according to the fish knowledge ontology of the target region, the text data is used as input to the text semantic analysis model based on pre-training, which extracts knowledge from the text data and outputs multiple first knowledge extraction results.

It is worth noting that in the step S12, the text semantic analysis model based on pre-training is applied to extract knowledge directly from the text data. In order to better illustrate the text semantic analysis model, this embodiment will introduce the training process of the text semantic analysis model.

Training Process of the Text Semantic Analysis Model

In some embodiments, the text semantic analysis model is obtained as follows. The text training data is taken as the first positive sample, and a first negative sample is constructed by an initial image semantic analysis model based on the knowledge extraction of the image training data, and the initial text semantic analysis model is trained according to the first positive sample and the first negative sample to obtain the text semantic analysis model.

It is worth noting that the initial text semantic analysis model is an untrained text semantic analysis model. After the initial text semantic analysis model is trained and the training frequency or loss function is stable, the text semantic analysis model is obtained. The first positive sample is original text training data of the initial text semantic analysis model, and a second positive sample is original image training data of an initial image semantic analysis model. The first negative sample data is obtained by extracting replacement data from positive training results of images and partially replacing the original text training data with the replacement data. The image training results include: image positive training results and image negative training results. The second negative sample data is obtained by inputting the original text training data into the initial text semantic analysis model, outputting the text positive training results, extracting replacement data from the text positive training results and partially replacing the original image training data with the replacement data.

In some embodiments, the constructing a first negative sample by an initial image semantic analysis model that performs the knowledge extraction on image training data includes: taking the image training data as the second positive sample, inputting the second positive sample into the initial image semantic analysis model for the knowledge extraction, and outputting image positive training results; extracting first replacement data from the image positive training results, and replacing the first positive sample with the first replacement data to obtain the first negative sample. The initial image semantic analysis model is used to generate the image semantic analysis model after iterative training so that the knowledge extraction of the image data be capable of being performed according to the image semantic analysis model.

It is worth noting that the first replacement data is a sample sampled from the image positive training results, which is used to partially replace the original text training data (i.e., the first positive sample) of the initial text semantic analysis model. The second replacement data is a sample sampled from the text positive training results, which is used to partially replace the original image positive training data (i.e., the second positive sample) of the initial image semantic analysis model.

In some embodiments, when the second positive sample is input into the initial image semantic analysis model for knowledge extraction, the first replacement data is extracted from the output positive training results corresponding to the second positive sample to replace the first positive sample data to obtain the first negative sample. The data length of the first replacement data is smaller than that of the first positive sample.

In some embodiments, when the second negative sample is input into the initial image semantic analysis model for knowledge extraction, the first replacement data can be extracted from the image negative training results corresponding to the output of the second negative sample to replace the first positive sample data to obtain the first negative sample. The data length of the first replacement data is smaller than that of the first positive sample.

In some embodiments, the first replacement data can be an entity sampled from the image positive training results, such that the entity sampled from the image positive training results replaces the head or tail entity in the first positive sample.

In some embodiments, the first replacement data can also be an entity sampled from the image negative training results, such that the entity sampled from the image negative training results replaces the head or tail entity in the first positive sample.

In some embodiments, the first positive sample includes: entities, relationships, and attributes of the text training data, and the entities include: a head entity and a tail entity.

In some embodiments, the first negative sample includes entities, relationships, and attributes of the text training data, and entities of the image training data.

In some embodiments, the second positive sample includes: entities, relationships, and attributes of the image training data, and the entities include: a head entity and a tail entity.

In some embodiments, the second negative sample includes: entities, relationships, and attributes of the image training data, and entities of the text training data.

It is worth noting that since the text training data and the image training data correspond to each other, the entities extracted from the text training data and the image training data can be replaced with each other to generate negative samples for training.

In some embodiments, the first positive sample and the first negative sample are input into the initial text semantic analysis model, and the text positive training results and text negative training results are output respectively. According to the text positive training results and text negative training results, a pre-defined text loss function is calculated, and parameters of the initial text semantic analysis model are updated according to the text loss function.

In some embodiments, the text loss function can be expressed as:

$$\mathcal{L}_1 = \sum_{x \in S_{t,1}} \sum_{x' \in S_{f,1}} (\Delta x + f(x) - f(x')).$$

In the text loss function, x and x' are the first positive sample and the first negative sample respectively, $S_{t,1}$ and $S_{f,1}$ are the triplet set of the first positive sample and the triplet set of the first negative sample respectively; $\Delta x$ is the sample interval between the first positive sample and the first negative sample; f(•) is an output function of the initial text semantic analysis model.

In some embodiments, the triplet set $S_{t,1}$ of the first positive sample and the triplet set $S_{f,1}$ of the first negative sample can be expressed as:

$$S_{t,1} = \{(h, r, t) | h, t \in E\};$$

$$S_{f,1} = \{(h', r, t), (h, r, t') | h', t' \in E'\}.$$

In the formulas, h, r, t are the head entity, relationship and tail entity of the first positive sample respectively, and E is an entity set of the first positive sample, including the head entity and the tail entity; h' and t' are the head entity and the tail entity of the first negative sample, and E' is an entity set of the first replacement data.

This embodiment uses a pre-trained text semantic analysis model to extract knowledge from the text data, which can automatically extract knowledge to avoid errors caused by manual operations. In addition, the initial text semantic analysis model is trained in combination with the image semantic analysis model, which can couple information between the image data and the text data, thus improving the generalization ability based on the text semantic analysis model, and further improving the processing efficiency of fish information in unstructured text data.

Acquisition of Text Information Weights

In some embodiments, the measuring information content of the multiple first knowledge extraction results respectively to obtain text information weights includes: taking information in the text data as total information and information in the multiple first knowledge extraction results as target information; obtaining the information content of the multiple first knowledge extraction results successively according to the total information and the target information, and obtaining the text information weights of the multiple first knowledge extraction results respectively based on the text information content and an entropy weight method.

In some embodiments, the obtaining the text information weights of the multiple first knowledge extraction results respectively based on the information content and an entropy weight method includes: normalizing the text information content to obtain multiple normalized results, forming the multiple normalized results into an information vector in a one-dimensional form, obtaining an information entropy of each value of the information vector, and according to the information entropy, obtaining the text information weights corresponding to the multiple first knowledge extraction results.

In some embodiments, the text information weights corresponding to the first knowledge extraction results can be measured by the information entropy of each value of the information vector, and redundant information can be obtained according to the information entropy of each value of the information vector, and the text information weights corresponding to the first knowledge extraction results can be measured by the redundant information.

It is worth noting that when the information entropy is used to directly measure the text information weights, the smaller the probability of the first knowledge extraction results calculated in the text data, the larger the fish information content they contain, and the greater the corresponding text information weights. Therefore, if the fish information in the target region is more complex, the more different cases of the first knowledge extraction results, the greater the total information entropy.

This embodiment adopts the information measurement of the first knowledge extraction results, and obtains the text information weights based on the entropy weight method, so that the text information weights are measured according to the information content in the text information. The complexity of the text data can be obtained through the text information weights. The first knowledge extraction results and the second knowledge extraction results are precisely matched with the fish in the target region based on the text information weights and image information weights, and a more accurate multi-modal knowledge graph is constructed, so as to improve the accuracy of unstructured fish information processing.

Next, the process of knowledge extraction from unstructured image data will be introduced.

It is worth noting that the knowledge extraction of image data includes: the training process of image extraction model and the formal use process of image extraction model. In this embodiment, the image extraction model is the image semantic analysis model.

Step S13: according to the fish knowledge ontology in the target region, performing the knowledge extraction on the at least one image data to obtain multiple second knowledge extraction results, and measuring information content of the multiple second knowledge extraction results respectively to obtain image information weights; where the multiple second knowledge extraction results include: entities and a relationship between the entities in the at least one image data.

In some embodiments, according to the fish knowledge ontology in the target region, the image data is used as the input of a pre-trained image semantic analysis model, which extracts knowledge from the image data and outputs the multiple second knowledge extraction results.

It is worth noting that in the step S13, the image semantic analysis model based on pre-training is applied to extract knowledge directly from the image data. In order to better illustrate the image semantic analysis model, this embodiment will introduce the training process of the image semantic analysis model.

Training Process of the Image Semantic Analysis Model

In some embodiments, the image semantic analysis model is obtained by: taking the image training data as the second positive sample, and constructing the second negative sample by the initial image semantic analysis model based on the knowledge extraction of the text training data; training the initial image semantic analysis model according to the second positive sample and the second negative sample to generate the image semantic analysis model.

In some embodiments, the second negative sample is constructed according to the initial image semantic analysis model based on the knowledge extraction of the text training data, including: the second replacement data is extracted from the text positive training results, and the second positive sample is randomly replaced with the second replacement data to obtain the second negative sample.

In some embodiments, the second positive sample is input into the initial image semantic analysis model for knowledge extraction, and the positive image training results are output, including: the second positive sample is input into the decoder of the initial image semantic analysis model, output feature layer parameters are obtained, the similarity between the feature layer parameters and the feature layer parameters of the read image training data that has been extracted by knowledge is obtained, and the image positive training results are output according to the similarity.

In some embodiments, the image positive training results are output according to the similarity, including: if the similarity is not within the preset threshold range, the feature layer parameters are input to the encoder of the initial image semantic analysis model, and the image positive training results of the second positive sample are output; otherwise, the positive training results corresponding to the read image training data are taken as the positive training results of the second positive sample.

In some embodiments, the second negative sample is input into the initial image semantic analysis model for knowledge extraction, and the image negative training results are output, including: the second negative sample is input into the decoder of the initial image semantic analysis model, the output feature layer parameters are obtained, the similarity between the feature layer parameters and the feature layer parameters of the read image training data that has been extracted by knowledge is obtained, and the image negative training results are output according to the similarity.

In some embodiments, the image negative training results are output according to the similarity, including: if the similarity is not within the preset threshold range, the feature layer parameters are input to the encoder of the initial image semantic analysis model, and the image negative training results of the second negative sample are output; otherwise, the image negative training results corresponding to the read image training data are taken as the image negative training results of the second negative sample.

In this embodiment, the disclosure compares the read image training data with the feature layer parameters of the image training data being trained. If the similarity of the feature layer parameters is within the preset threshold range, the encoder can skip the processing of the feature layer parameters and directly take the image positive training results of the read image training data as the image positive training results of the current training. Thus, the training efficiency of the image semantic analysis model can be improved, and the processing efficiency of the unstructured fish information can be improved.

In some embodiments, the initial image semantic analysis model is trained according to the image positive training results, and the image semantic analysis model is obtained, including: the first positive sample is taken as the input of the initial text semantic analysis model to output the text positive training results correspondingly, and the second replacement data is extracted from the text positive training results, and the second positive sample is randomly replaced with the second replacement data to obtain the second negative sample; the initial image semantic analysis model is trained according to the second positive sample and the second negative sample, and the image semantic analysis model is obtained.

In some embodiments, the second positive sample and the second negative sample are input into the initial image semantic analysis model respectively, and the image positive training results and the image negative training results are output respectively. According to the image positive training results and the image negative training results, a pre-defined image loss function is calculated, and parameters of the initial image semantic analysis model are updated according to the image loss function.

In some embodiments, the image loss function can be expressed as:

$$\mathcal{L}_2 = \sum_{y \in S_{t,2}} \sum_{y' \in S_{f,2}} (\Delta y + f(y) - f(y')).$$

In the function, y and y' are the second positive sample and the second negative sample respectively, $S_{t,2}$ and $S_{f,2}$ are the triplet set of the second positive sample and the triplet set of the second negative sample respectively; $\Delta y$ is the sample interval between the second positive sample and the second negative sample; f(•) is the output function of the initial image semantic analysis model.

In some embodiments, the triplet set $S_{t,2}$ of the second positive sample and the triplet set $S_{f,2}$ of the second negative sample can be expressed as:

$$S_{t,2} = \{(h, r, t) | h, t \in E_2\};$$

$$S_{f,2} = \{(h', r, t), (h, r, t') | h', t' \in E_2'\}.$$

In the formulas, h, r, t are the head entity, relationship and tail entity of the second positive sample respectively, $E_2$ is the entity set of the second positive sample, including: head entity and tail entity; h' and t' are the head entity and the tail entity of the second negative sample, and $E_2'$ is the entity set of the second replacement data.

Figure 2:
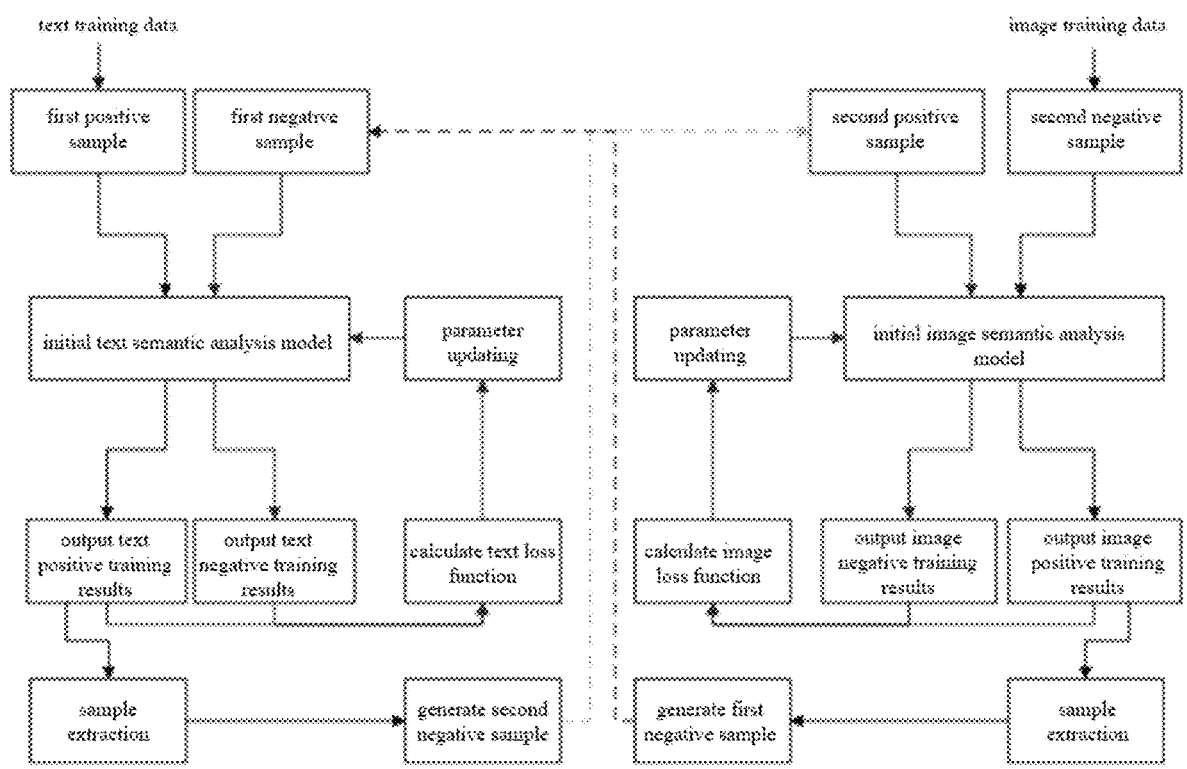
FIG. 2 illustrates a schematic flowchart of training of a knowledge extraction model of unstructured data according to the embodiment of the disclosure.

In some embodiments, FIG. 2 illustrates a schematic flowchart of training of a knowledge extraction model of unstructured data according to the embodiment of the disclosure. In FIG. 2, the unstructured data includes the text training data and the image training data, and the training of the knowledge extraction model includes the initial text semantic analysis model and the initial image semantic analysis model. The text training data is input into the initial text semantic analysis model as the first positive sample, and the text positive training results are output. The text positive training results output by the initial text semantic analysis model are sampled to obtain replacement entities, and the image positive training results are randomly replaced with the replacement entities to generate the second negative sample. The second negative sample is taken as the input of the initial image semantic analysis model, and the negative training results are output.

In addition, the image training data is input into the initial image semantic analysis model as the second positive sample, and the image positive training results are output. The image positive training results output by the initial image semantic analysis model are sampled to obtain the replacement entities, and the text positive training results are randomly replaced with the replacement entities to generate the first negative sample. The first negative sample is taken as the input of the initial text semantic analysis model, and the text negative training results are output.

Finally, the text loss function is calculated according to the text positive training results and the text negative training results, and the parameters of the initial text semantic analysis model are updated. At the same time, the image loss function is calculated according to the positive training results and negative training results, and the parameters of the initial image semantic analysis model are refined.

Acquisition of Image Information Weights

In some embodiments, the information content of multiple second knowledge extraction results is measured separately to obtain image information weights, including: pixel information in the image data is taken as total information and pixel information in the second knowledge extraction results is taken as target information, the image information content of the multiple second knowledge extraction results is obtained successively according to the total information and the target information, and the image information weights of the multiple second knowledge extraction results are obtained respectively based on the text information content and the entropy weight method.

In some embodiments, based on the text information content and the entropy weight method, the image information weights of the multiple second knowledge extraction results are obtained respectively, including: the image information content is normalized to obtain multiple normalized results, the multiple normalized results are formed into a one-dimensional information vector to obtain the information entropy of each value of the information vector, and the image information weights corresponding to the second knowledge extraction results are obtained according to the information entropy.

In some embodiments, the image information weights corresponding to the second knowledge extraction results can be measured by the information entropy of each value of the information vector, and the redundant information can be obtained according to the information entropy of each value of the information vector, and the image information weights corresponding to the second knowledge extraction results can be measured by the redundant information.

Construction of Multi-Modal Knowledge Graph

Step S14: according to the text information weights and the image information weights, matching the first knowledge extraction results and the second knowledge extraction results with the fish knowledge ontology in the target region, and constructing a multi-modal knowledge graph as the fish knowledge graph.

In some embodiments, the multi-modal knowledge graph is constructed, including: the entities and the relationship in the first knowledge extraction results and the entities and the relationship in the second knowledge extraction results are aligned and fused according to the text information weights and image information weights to obtain a knowledge fusion result, and the knowledge fusion result is matched with the fish knowledge ontology in the target region to construct the multi-modal knowledge graph.

In some embodiments, the entities and the relationship in the first knowledge extraction results and the entities and relationship in the second knowledge extraction results are aligned and fused according to the text information weights and the image information weights to obtain the knowledge fusion result, including: the relationship between the entities is taken as the identifier, the entities in the first knowledge extraction results and the entities in the second knowledge extraction results are sorted according to the entity name. If the entity name and identifier are the same, the first knowledge extraction results and the second knowledge extraction results of the same entity name are fused and weighted according to the text information weights and image information weights, so as to obtain the knowledge fusion result.

Figure 3:
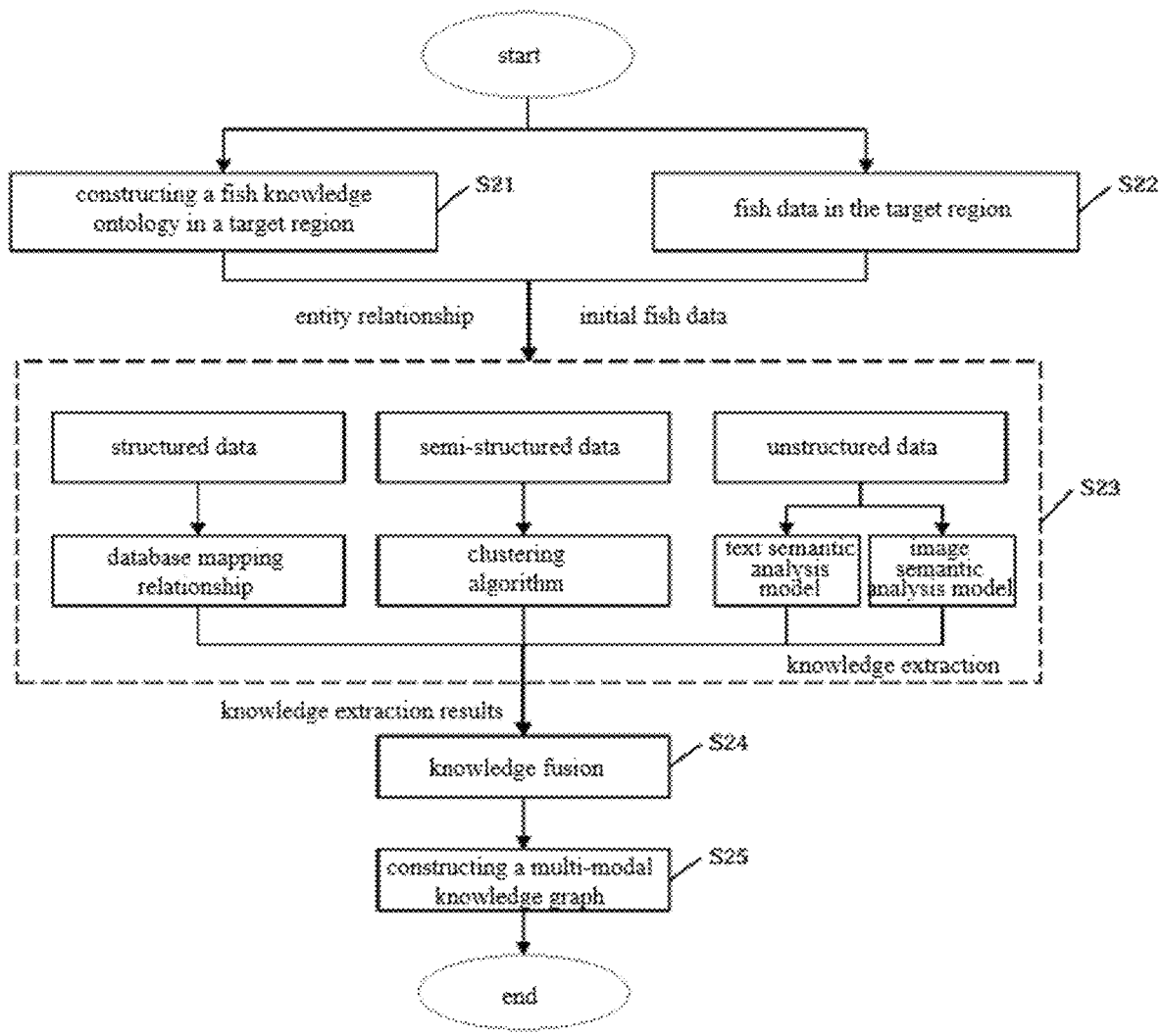
FIG. 3 illustrates a schematic flowchart of another method for constructing a fish knowledge graph in a target region according to an embodiment of the disclosure.

In some embodiments, FIG. 3 illustrates a schematic flowchart of another method for constructing a fish knowledge graph in a target region according to an embodiment of the disclosure. In FIG. 3, knowledge extraction is carried out on the structured data, the semi-structured data and the unstructured data at the same time. After knowledge fusion, the multi-modal knowledge graph is constructed.

In this embodiment, knowledge extraction is carried out on the unstructured text data and the image data respectively, and information measurement is carried out on the knowledge extraction results of the two types of data respectively, and the text information weights and the image information weights are obtained correspondingly. Based on the information weights of the two types of data information, a variety of unstructured information can be synthesized to construct an accurate multi-modal knowledge graph, and the error caused by manual operation can be avoided.

Embodiment 2

Figure 4:
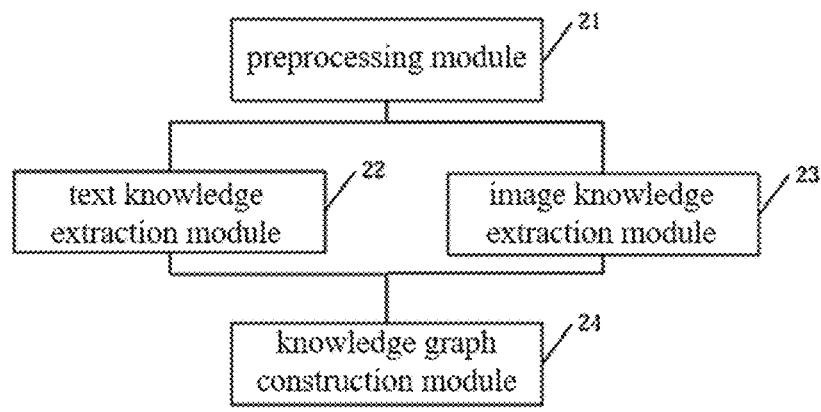
FIG. 4 illustrates a schematic structural diagram of an ontology-driven system for constructing a fish knowledge graph in a target region according to an embodiment of the disclosure.

Referring to FIG. 4, FIG. 4 illustrates a schematic structural diagram of an ontology-driven system for constructing a fish knowledge graph in a target region according to an embodiment of the disclosure, including: a preprocessing module 21, a text knowledge extraction module 22, an image knowledge extraction module 23 and a knowledge graph construction module 24. In some embodiments, each of the preprocessing module 21, the text knowledge extraction module 22, the image knowledge extraction module 23 and the knowledge graph construction module 24 is embodied by software stored in at least one memory and executable by at least one processor.

In some embodiments, the preprocessing module 21 collects a fish data source in the target region, outputs the fish knowledge ontology, text data and image data in the target region, transmits the fish knowledge ontology in the target region to the text knowledge extraction module 22 and the image knowledge extraction module 23 respectively, and transmits the text data and the image data to the text knowledge extraction module 22 and the image knowledge extraction module 23 respectively. After receiving the text data and the fish knowledge ontology in the target region, the text knowledge extraction module 22 outputs the text information weights corresponding to multiple first knowledge extraction results, and transmits the text information weights and the fish knowledge ontology in the target region to the knowledge graph construction module 24. Alternatively, the fish knowledge ontology in the target region is received by the image knowledge extraction module 23, and the fish knowledge ontology in the target region is transmitted to the knowledge graph construction module 24. After receiving the image data and the fish knowledge ontology in the target region, the image knowledge extraction module 23 outputs the image information weights corresponding to multiple second knowledge extraction results, and transmits the image information weights to the knowledge graph construction module 24. After receiving the fish knowledge ontology, the text information weights and the image information weights in the target region, the knowledge graph construction module 24 outputs the multi-modal knowledge graph.

In some embodiments, the preprocessing module 21 collects the fish data source in the target region, outputs the fish knowledge ontology, the text data and the image data in the target region, transmits the fish knowledge ontology in the target region to the text knowledge extraction module 22, the image knowledge extraction module 23 and the knowledge graph construction module 24, respectively, and transmits the text data and the image data to the text knowledge extraction module 22 and image knowledge extraction module 23 respectively. After receiving the text data and the fish knowledge ontology in the target region, the text knowledge extraction module 22 outputs the text information weights corresponding to multiple first knowledge extraction results, and transmits the text information weights to the knowledge graph construction module 24. After receiving the image data and the fish knowledge ontology in the target region, the image knowledge extraction module 23 outputs the image information weights corresponding to multiple second knowledge extraction results, and transmits the image information weights to the knowledge graph construction module 24. After receiving the fish knowledge ontology, the text information weights and the image information weights in the target region, the knowledge graph construction module 24 outputs the multi-modal knowledge graph.

The pre-processing module 21 is used to comb the fish data source in the target region, construct the fish knowledge ontology in the target region, and collect the text data in an unstructured form of the fish data source in the target region and at least one image data corresponding to the text data.

In some embodiments, the combing a fish data source in the target region includes methods such as data processing, picture tagging, document splitting knowledge extraction or word processing techniques based on at least one of the species, distribution, ecological habits or economic value of fish.

In some embodiments, according to the species, distribution, ecological habits and economic value of fish, the data processing, picture tagging, document splitting knowledge extraction or word processing are carried out to construct the fish knowledge ontology in the target region.

In some embodiments, the fish knowledge ontology of the target region is represented in the triplet form of [head entity, relationship, tail entity]. The entities include the head entity and the tail entity.

In some embodiments, the fish knowledge ontology of the target region is represented in the triplet form of [entity, relationship, attribute].

In some embodiments, the collecting text data of the fish data source in the target region and at least one image data corresponding to the text data includes at least one of structured data, semi-structured data and unstructured data.

In some embodiments, according to the fish knowledge ontology of the target region, the classification algorithm can be used to extract knowledge from semi-structured text data and text data corresponding to the at least one image data. Specifically, SVM or logistic regression algorithm can be used.

In some embodiments, the database mapping relationship can be adopted when the structured text data and the at least one image data corresponding to the text data are extracted according to the fish knowledge ontology in the target region. Specifically, RDB to RDF data set mapping language can be used.

In some embodiments, R2RML can be used to extract knowledge from the structured data.

In some embodiments, knowledge extraction of unstructured text data is carried out through a pre-trained text semantic analysis model according to the fish knowledge ontology in the target region.

In some embodiments, knowledge extraction of unstructured image data is carried out through a pre-trained image semantic analysis model according to the fish knowledge ontology in the target region.

In some embodiments, the knowledge extraction includes at least one of entity extraction, relationship extraction between the entities, and attribute extraction of the entities.

Next, the process of knowledge extraction from unstructured text data will be introduced.

It is worth explaining that the knowledge extraction of text data includes the training process of a text extraction model and the formal use process of the text extraction model. In this embodiment, the text extraction model is a text semantic analysis model.

The text knowledge extraction module 22 is used for according to the fish knowledge ontology of the target region, performing knowledge extraction on the text data to obtain multiple first knowledge extraction results, and measuring information content of the multiple first knowledge extraction results respectively to obtain text information weights. The multiple first knowledge extraction results include: entities and a relationship between the entities in the text data.

It is worth noting that the first knowledge extraction results are results of knowledge extraction of the text data, including: the relationship between entities in the text data and entities in the text data. The second knowledge extraction results are results after knowledge extraction of image data, including: the relationship between entities in the image data and entities in the image data.

In some embodiments, according to the fish knowledge ontology of the target region, the text data is used as input to the text semantic analysis model based on pre-training, which extracts knowledge from the text data and outputs multiple first knowledge extraction results.

It is worth noting that in the step S12, the text semantic analysis model based on pre-training is applied to extract knowledge directly from the text data. In order to better illustrate the text semantic analysis model, this embodiment will introduce the training process of the text semantic analysis model.

Training Process of the Text Semantic Analysis Model

In some embodiments, the text semantic analysis model is obtained as follows. The text training data is taken as the first positive sample, and a first negative sample is constructed by an initial image semantic analysis model based on the knowledge extraction of the image training data, and the initial text semantic analysis model is trained according to the first positive sample and the first negative sample to obtain the text semantic analysis model.

It is worth noting that the initial text semantic analysis model is an untrained text semantic analysis model. After the initial text semantic analysis model is trained and the training frequency or loss function is stable, the text semantic analysis model is obtained. The first positive sample is original text training data of the initial text semantic analysis model, and a second positive sample is original image training data of an initial image semantic analysis model. The first negative sample data is obtained by extracting replacement data from positive training results of images and partially replacing the original text training data with the replacement data. The image training results include: image positive training results and image negative training results. The second negative sample data is obtained by inputting the original text training data into the initial text semantic analysis model, outputting the text positive training results, extracting replacement data from the text positive training results and partially replacing the original image training data with the replacement data.

In some embodiments, the constructing a first negative sample by an initial image semantic analysis model that performs the knowledge extraction on image training data includes: taking the image training data as the second positive sample, inputting the second positive sample into the initial image semantic analysis model for the knowledge extraction, and outputting image positive training results; extracting first replacement data from the image positive training results, and replacing the first positive sample with the first replacement data to obtain the first negative sample. The initial image semantic analysis model is used to generate the image semantic analysis model after iterative training so that the knowledge extraction of the image data be capable of being performed according to the image semantic analysis model.

It is worth noting that the first replacement data is a sample sampled from the image positive training results, which is used to partially replace the original text training data (i.e., the first positive sample) of the initial text semantic analysis model. The second replacement data is a sample sampled from the text positive training results, which is used to partially replace the original image positive training data (i.e., the second positive sample) of the initial image semantic analysis model.

In some embodiments, when the second positive sample is input into the initial image semantic analysis model for knowledge extraction, the first replacement data is extracted from the output positive training results corresponding to the second positive sample to replace the first positive sample data to obtain the first negative sample. The data length of the first replacement data is smaller than that of the first positive sample.

In some embodiments, when the second negative sample is input into the initial image semantic analysis model for knowledge extraction, the first replacement data can be extracted from the image negative training results corresponding to the output of the second negative sample to replace the first positive sample data to obtain the first negative sample. The data length of the first replacement data is smaller than that of the first positive sample.

In some embodiments, the first replacement data can be an entity sampled from the image positive training results, such that the entity sampled from the image positive training results replaces the head or tail entity in the first positive sample.

In some embodiments, the first replacement data can also be an entity sampled from the image negative training results, such that the entity sampled from the image negative training results replaces the head or tail entity in the first positive sample.

In some embodiments, the first positive sample includes: entities, relationships, and attributes of the text training data, and the entities include: a head entity and a tail entity.

In some embodiments, the first negative sample includes entities, relationships, and attributes of the text training data, and entities of the image training data.

In some embodiments, the second positive sample includes: entities, relationships, and attributes of the image training data, and the entities include: a head entity and a tail entity.

In some embodiments, the second negative sample includes: entities, relationships, and attributes of the image training data, and entities of the text training data.

It is worth noting that since the text training data and the image training data correspond to each other, the entities extracted from the text training data and the image training data can be replaced with each other to generate negative samples for training.

In some embodiments, the first positive sample and the first negative sample are input into the initial text semantic analysis model, and the text positive training results and text negative training results are output respectively. According to the text positive training results and text negative training results, a pre-defined text loss function is calculated, and parameters of the initial text semantic analysis model are updated according to the text loss function.

In some embodiments, the text loss function can be expressed as:

$$\mathcal{L}_1 = \sum_{x \in S_{t,1}} \sum_{x' \in S_{f,1}} (\Delta x + f(x) - f(x')).$$

In the text loss function, x and x' are the first positive sample and the first negative sample respectively, $S_{t,1}$ and $S_{f,1}$ are the triplet set of the first positive sample and the triplet set of the first negative sample respectively; $\Delta x$ is the sample interval between the first positive sample and the first negative sample; $f(\bullet)$ is the output function of the initial text semantic analysis model.

In some embodiments, the triplet set $S_{t,1}$ of the first positive sample and the triplet set $S_{f,1}$ of the first negative sample can be expressed as:

$$S_{t,1} = \{(h, r, t) | h, t \in E\};$$

$$S_{f,1} = \{(h', r, t), (h, r, t') | h', t' \in E'\}.$$

In the formulas, h, r, t are the head entity, relationship and tail entity of the first positive sample respectively, and E is an entity set of the first positive sample, including the head entity and the tail entity; h' and t' are the head entity and the tail entity of the first negative sample, and E' is an entity set of the first replacement data.

In some embodiments, the measuring information content of the multiple first knowledge extraction results respectively to obtain text information weights includes: taking information in the text data as total information and information in the multiple first knowledge extraction results as target information; obtaining the information content of the multiple first knowledge extraction results successively according to the total information and the target information, and obtaining the text information weights of the multiple first knowledge extraction results respectively based on the text information content and an entropy weight method.

In some embodiments, the obtaining the text information weights of the multiple first knowledge extraction results respectively based on the information content and an entropy weight method includes: normalizing the text information content to obtain multiple normalized results, forming the multiple normalized results into an information vector in a one-dimensional form, obtaining an information entropy of each value of the information vector, and according to the information entropy, obtaining the text information weights corresponding to the multiple first knowledge extraction results.

In some embodiments, the text information weights corresponding to the first knowledge extraction results can be measured by the information entropy of each value of the information vector, and redundant information can be obtained according to the information entropy of each value of the information vector, and the text information weights corresponding to the first knowledge extraction results can be measured by the redundant information.

It is worth noting that when the information entropy is used to directly measure the text information weights, the smaller the probability of the first knowledge extraction results calculated in the text data, the larger the fish information content they contain, and the greater the corresponding text information weights. Therefore, if the fish information in the target region is more complex, the more different cases of the first knowledge extraction results, the greater the total information entropy.

Next, the process of knowledge extraction from unstructured image data will be introduced.

It is worth explaining that the knowledge extraction of image data includes: the training process of image extraction model and the formal use process of image extraction model. In this embodiment, the image extraction model is the image semantic analysis model.

The image knowledge extraction module 23 is used for according to the fish knowledge ontology in the target region, performing the knowledge extraction on the at least one image data to obtain multiple second knowledge extraction results, and measuring information content of the multiple second knowledge extraction results respectively to obtain image information weights. The multiple second knowledge extraction results include: entities and a relationship between the entities in the at least one image data.

In some embodiments, according to the fish knowledge ontology in the target region, the image data is used as the input of a pre-trained image semantic analysis model, which extracts knowledge from the image data and outputs the multiple second knowledge extraction results.

It is worth noting that in the step S13, the image semantic analysis model based on pre-training is applied to extract knowledge directly from the image data. In order to better illustrate the image semantic analysis model, this embodiment will introduce the training process of the image semantic analysis model.

Training Process of the Image Semantic Analysis Model

In some embodiments, the image semantic analysis model is obtained by: taking the image training data as the second positive sample, and constructing the second negative sample by the initial image semantic analysis model based on the knowledge extraction of the text training data; training the initial image semantic analysis model according to the second positive sample and the second negative sample to generate the image semantic analysis model.

In some embodiments, the second negative sample is constructed according to the initial image semantic analysis model based on the knowledge extraction of the text training data, including: the second replacement data is extracted from the text positive training results, and the second positive sample is randomly replaced with the second replacement data to obtain the second negative sample.

In some embodiments, the second positive sample is input into the initial image semantic analysis model for knowledge extraction, and the positive image training results are output, including: the second positive sample is input into the decoder of the initial image semantic analysis model, output feature layer parameters are obtained, the similarity between the feature layer parameters and the feature layer parameters of the read image training data that has been extracted by knowledge is obtained, and the image positive training results are output according to the similarity.

In some embodiments, the image positive training results are output according to the similarity, including: if the similarity is not within the preset threshold range, the feature layer parameters are input to the encoder of the initial image semantic analysis model, and the image positive training results of the second positive sample are output; otherwise, the positive training results corresponding to the read image training data are taken as the positive training results of the second positive sample.

In some embodiments, the second negative sample is input into the initial image semantic analysis model for knowledge extraction, and the image negative training results are output, including: the second negative sample is input into the decoder of the initial image semantic analysis model, the output feature layer parameters are obtained, the similarity between the feature layer parameters and the feature layer parameters of the read image training data that has been extracted by knowledge is obtained, and the image negative training results are output according to the similarity.

In some embodiments, the image negative training results are output according to the similarity, including: if the similarity is not within the preset threshold range, the feature layer parameters are input to the encoder of the initial image semantic analysis model, and the image negative training results of the second negative sample are output; otherwise, the image negative training results corresponding to the read image training data are taken as the image negative training results of the second negative sample.

In some embodiments, the initial image semantic analysis model is trained according to the image positive training results, and the image semantic analysis model is obtained, including: the first positive sample is taken as the input of the initial text semantic analysis model to output the text positive training results correspondingly, and the second replacement data is extracted from the text positive training results, and the second positive sample is randomly replaced with the second replacement data to obtain the second negative sample; the initial image semantic analysis model is trained according to the second positive sample and the second negative sample, and the image semantic analysis model is obtained.

In some embodiments, the second positive sample and the second negative sample are input into the initial image semantic analysis model respectively, and the image positive training results and the image negative training results are output respectively. According to the image positive training results and the image negative training results, a pre-defined image loss function is calculated, and parameters of the initial image semantic analysis model are updated according to the image loss function.

In some embodiments, the image loss function can be expressed as:

$$\mathcal{L}_2 = \sum_{y \in S_{t,2}} \sum_{y' \in S_{f,2}} (\Delta y + f(y) - f(y')).$$

In the function, y and y' are the second positive sample and the second negative sample respectively, $S_{t,2}$ and $S_{f,2}$ are the triplet set of the second positive sample and the triplet set of the second negative sample respectively; $\Delta y$ is the sample interval between the second positive sample and the second negative sample; $f(\cdot)$ is the output function of the initial image semantic analysis model.

In some embodiments, the triplet set $S_{t,2}$ of the second positive sample and the triplet set $S_{f,2}$ of the second negative sample can be expressed as:

$$S_{t,2} = \{(h, r, t) | h, t \in E_2\};$$

$$S_{f,2} = \{(h', r, t), (h, r, t') | h', t' \in E'_2\}.$$

In the formulas, h, r, t are the head entity, relationship and tail entity of the second positive sample respectively, $E_2$ is the entity set of the second positive sample, including: head entity and tail entity; h' and t' are the head entity and the tail entity of the second negative sample, and $E_2'$ is the entity set of the second replacement data.

In some embodiments, the information content of multiple second knowledge extraction results is measured separately to obtain image information weights, including: pixel information in the image data is taken as total information and pixel information in the second knowledge extraction results is taken as target information, the image information content of the multiple second knowledge extraction results is obtained successively according to the total information and the target information, and the image information weights of the multiple second knowledge extraction results are obtained respectively based on the text information content and the entropy weight method.

In some embodiments, based on the text information content and the entropy weight method, the image information weights of the multiple second knowledge extraction results are obtained respectively, including: the image information content is normalized to obtain multiple normalized results, the multiple normalized results are formed into a one-dimensional information vector to obtain the information entropy of each value of the information vector, and the image information weights corresponding to the second knowledge extraction results are obtained according to the information entropy.

In some embodiments, the image information weights corresponding to the second knowledge extraction results can be measured by the information entropy of each value of the information vector, and the redundant information can be obtained according to the information entropy of each value of the information vector, and the image information weights corresponding to the second knowledge extraction results can be measured by the redundant information.

The knowledge graph construction module 24 is used for according to the text information weights and the image information weights, matching the first knowledge extraction results and the second knowledge extraction results with the fish knowledge ontology in the target region, and constructing a multi-modal knowledge graph as the fish knowledge graph.

In some embodiments, the multi-modal knowledge graph is constructed, including: the entities and the relationship in the first knowledge extraction results and the entities and the relationship in the second knowledge extraction results are aligned and fused according to the text information weights and image information weights to obtain a knowledge fusion result, and the knowledge fusion result is matched with the fish knowledge ontology in the target region to construct the multi-modal knowledge graph.

In some embodiments, the entities and the relationship in the first knowledge extraction results and the entities and relationship in the second knowledge extraction results are aligned and fused according to the text information weights and the image information weights to obtain the knowledge fusion result, including: the relationship between the entities is taken as the identifier, the entities in the first knowledge extraction results and the entities in the second knowledge extraction results are sorted according to the entity name. If the entity name and identifier are the same, the first knowledge extraction results and the second knowledge extraction results of the same entity name are fused and weighted according to the text information weights and image information weights, so as to obtain the knowledge fusion result.

In this embodiment, knowledge extraction is carried out on the unstructured text data and the image data respectively, and information measurement is carried out on the knowledge extraction results of the two types of data respectively, and the text information weights and the image information weights are obtained correspondingly. Based on the information weights of the two types of data information, a variety of unstructured information can be synthesized to construct an accurate multi-modal knowledge graph, and the error caused by manual operation can be avoided.

Those skilled in the art should understand that embodiments of the disclosure may also be made available including computer program products. Therefore, the disclosure may take the form of a full hardware embodiment, a full software embodiment, or a combination of software and hardware embodiment. In an embodiment, the disclosure may take the form of a computer program product implemented on one or more computer available storage media (including but not limited to disk memory, compact disc read-only memory abbreviated as CD-ROM, optical memory, etc.) in which computer available program code is contained.

The disclosure is described with reference to flowchart illustrations and/or block diagrams of methods, apparatus (systems), and computer program products according to embodiments of the disclosure. It will be understood that each flow and/or block of the flowchart illustrations and/or block diagrams, and combinations of flows and/or blocks in the flowchart illustrations and/or block diagrams, can be implemented by computer program instructions. These computer program instructions may be provided to a processor of a general-purpose computer, special purpose computer, embedded processor, or other programmable data processing apparatus to produce a machine, such that the instructions, which execute via processor of the computer or other programmable data processing apparatus, create means for implementing the functions specified one flow or multiple flows in the flowchart and/or one or multiple blocks in the block diagram.

These computer program instructions may also be stored in a computer-readable memory that can direct a computer or other programmable data processing apparatus to function in a particular manner, such that the instructions stored in the computer-readable memory produce an article of manufacture including an instruction device. The instruction device implements the functions specified in one flow or multiple flows in the flowchart and/or one or multiple blocks in the block diagram.

The computer program instructions may also be loaded onto a computer or other programmable data processing apparatus to cause a series of operational steps to be performed on the computer or other programmable apparatus to produce a computer implemented process, such that the instructions which execute on the computer or other programmable apparatus provide steps for implementing the functions specified in one flow or multiple flows in the flowchart and/or one or multiple blocks in the block diagram.

The above is only the illustrated embodiments of the disclosure, it should be pointed out that for those in the art, without deviating from the technical principle of the disclosure, a number of changes and deformation can also be made, and these changes and deformation should also be considered as the scope of protection of the disclosure.

What is claimed is:

1. An ontology-driven method for constructing a fish knowledge graph in a target region, comprising:
    combing a fish data source in the target region, constructing a fish knowledge ontology in the target region, and collecting text data in an unstructured form of the fish data source in the target region and at least one image data corresponding to the text data;
    according to the fish knowledge ontology of the target region, performing knowledge extraction on the text data to obtain a plurality of first knowledge extraction results, and measuring text information content of the plurality of first knowledge extraction results respectively to obtain text information weights; wherein the plurality of first knowledge extraction results comprise: entities and a relationship between the entities in the text data;
    according to the fish knowledge ontology in the target region, performing the knowledge extraction on the at least one image data to obtain a plurality of second knowledge extraction results, and measuring image information content of the plurality of second knowledge extraction results respectively to obtain image information weights; wherein the plurality of second knowledge extraction results comprise: entities and a relationship between the entities in the at least one image data; and
    according to the text information weights and the image information weights, matching the plurality of first knowledge extraction results and the plurality of second knowledge extraction results with the fish knowledge ontology in the target region, and constructing a multi-modal knowledge graph as the fish knowledge graph;
    applying the multi-modal knowledge graph with the entities and the relationship between the entities to provide a personalized recommendation service by leveraging entity-relationship patterns derived from the multi-modal knowledge graph, thereby enhancing recommendation accuracy and reducing manual curation efforts;
    wherein the performing knowledge extraction on the text data to obtain a plurality of first knowledge extraction results comprises:
        taking the text data as input of a text semantic analysis model based on pre-training for the knowledge extraction, and outputting the plurality of first knowledge extraction results; wherein the text semantic analysis model is obtained by: taking a text training data as a first positive sample, constructing a first negative sample by an initial image semantic analysis model that performs the knowledge extraction on image training data, and training an initial text semantic analysis model according to the first positive sample and the first negative sample to obtain the text semantic analysis model;
    wherein the constructing a first negative sample by an initial image semantic analysis model that performs the knowledge extraction on image training data comprises:
        taking the image training data as a second positive sample, inputting the second positive sample into the initial image semantic analysis model for the knowledge extraction, and outputting image positive training results; extracting first replacement data from the image positive training results, and replacing the first positive sample with the first replacement data to obtain the first negative sample; wherein the initial image semantic analysis model is configured to generate the image semantic analysis model after iterative training so that the knowledge extraction of the at least one image data be capable of being performed according to the image semantic analysis model; and
    wherein the inputting the second positive sample into the initial image semantic analysis model for the knowledge extraction, and outputting image positive training results comprises:
        inputting the second positive sample into a decoder of the initial image semantic analysis model, obtaining output feature layer parameters, and obtaining similarity between the output feature layer parameters and feature layer parameters of read image training data that has been performed the extraction by knowledge, and outputting the image positive training results according to the similarity.

2. The ontology-driven method for constructing the fish knowledge graph in the target region as claimed in claim 1, wherein the outputting the image positive training results according to the similarity comprises:
    when the similarity is not within a preset threshold range, taking the output feature layer parameters as input of an encoder of the initial image semantic analysis model, and outputting the image positive training results of the second positive sample;
    when the similarity is within a preset threshold range, taking the image positive training results corresponding to the read image training data as the image positive training results of the second positive sample;
    according to the image positive training results, training the initial image semantic analysis model to obtain the image semantic analysis model.

3. The ontology-driven method for constructing the fish knowledge graph in the target region as claimed in claim 2, wherein the according to the image positive training results, training the initial image semantic analysis model to obtain the image semantic analysis model comprises:
    taking the first positive sample as input of the initial text semantic analysis model, outputting text positive training results correspondingly, extracting second replacement data from the text positive training results, and randomly replacing the second positive sample with the second replacement data to obtain a second negative sample; and according to the second positive sample and the second negative sample, training the initial image semantic analysis model to obtain the image semantic analysis model.

4. The ontology-driven method for constructing the fish knowledge graph in the target region as claimed in claim 1, wherein the measuring text information content of the plurality of first knowledge extraction results respectively to obtain text information weights comprises:

taking information in the text data as total information and information in the plurality of first knowledge extraction results as target information; obtaining the information content of the plurality of first knowledge extraction results successively according to the total information and the target information, and obtaining the text information weights of the plurality of first knowledge extraction results respectively based on the text information content and an entropy weight method.

5. The ontology-driven method for constructing the fish knowledge graph in the target region as claimed in claim 4, wherein the obtaining the text information weights of the plurality of first knowledge extraction results respectively based on the text information content and an entropy weight method comprises:

normalizing the text information content to obtain a plurality of normalized results, forming the plurality of normalized results into an information vector in a one-dimensional form, obtaining an information entropy of each value of the information vector, and according to the information entropy, obtaining the text information weights corresponding to the plurality of first knowledge extraction results.

6. The ontology-driven method for constructing the fish knowledge graph in the target region as claimed in claim 1, wherein the constructing a multi-modal knowledge graph comprises:

according to the text information weights and the image information weights, aligning and fusing the entities and the relationship in the plurality of first knowledge extraction results and the entities and the relationship in the plurality of second knowledge extraction results to obtain a knowledge fusion result, and matching the knowledge fusion result with the fish knowledge ontology in the target region to construct the multi-modal knowledge graph.

7. An ontology-driven system for constructing a fish knowledge graph in a target region, comprising: at least one processor and memory storing instructions executable by the processor to implement processes of a preprocessing module, a text knowledge extraction module, an image knowledge extraction module, and a knowledge graph construction module;

wherein the preprocessing module is configured to comb a fish data source in the target region, construct a fish knowledge ontology in the target region, and collect text data in an unstructured form of the fish data source in the target region and at least one image data corresponding to the text data;

the text knowledge extraction module is configured to, according to the fish knowledge ontology of the target region, perform knowledge extraction on the text data to obtain a plurality of first knowledge extraction results, and measure text information content of the plurality of first knowledge extraction results respectively to obtain text information weights; and the plurality of first knowledge extraction results comprise: entities and a relationship between the entities in the text data;

the image knowledge extraction module is configured to, according to the fish knowledge ontology in the target region, perform the knowledge extraction on the at least one image data to obtain a plurality of second knowledge extraction results, and measure image information content of the plurality of second knowledge extraction results respectively to obtain image information weights; and the plurality of second knowledge extraction results comprise: entities and a relationship between the entities in the at least one image data;

the knowledge graph construction module is configured to, according to the text information weight and the image information weight, match the plurality of first knowledge extraction results and the plurality of second knowledge extraction results with the fish knowledge ontology in the target region, and construct a multi-modal knowledge graph as the fish knowledge graph; apply the multi-modal knowledge graph with the entities and the relationship between the entities to provide a personalized recommendation service by leveraging entity-relationship patterns derived from the multi-modal knowledge graph, thereby enhancing recommendation accuracy and reducing manual curation efforts;

wherein the step of performing knowledge extraction on the text data to obtain a plurality of first knowledge extraction results comprises:

taking the text data as input of a text semantic analysis model based on pre-training for the knowledge extraction, and outputting the plurality of first knowledge extraction results; wherein the text semantic analysis model is obtained by: taking a text training data as a first positive sample, constructing a first negative sample by an initial image semantic analysis model that performs the knowledge extraction on image training data, and training an initial text semantic analysis model according to the first positive sample and the first negative sample to obtain the text semantic analysis model;

wherein the step of constructing a first negative sample by an initial image semantic analysis model that performs the knowledge extraction on image training data comprises:

taking the image training data as a second positive sample, inputting the second positive sample into the initial image semantic analysis model for the knowledge extraction, and outputting image positive training results; extracting first replacement data from the image positive training results, and replacing the first positive sample with the first replacement data to obtain the first negative sample; wherein the initial image semantic analysis model is configured to generate the image semantic analysis model after iterative training so that the knowledge extraction of the at least one image data be capable of being performed according to the image semantic analysis model; and wherein the step of inputting the second positive sample into the initial image semantic analysis model for the knowledge extraction, and outputting image positive training results comprises:

inputting the second positive sample into a decoder of the initial image semantic analysis model, obtaining output feature layer parameters, and obtaining similarity between the output feature layer parameters and feature layer parameters of read image training data that has been performed the extraction by knowledge, and outputting the image positive training results according to the similarity.

\* \* \* \* \*